(12) United States Patent
Kawakami

(10) Patent No.: US 6,332,058 B1
(45) Date of Patent: Dec. 18, 2001

(54) INFORMATION REPRODUCTION APPARATUS AND INFORMATION REPRODUCTION METHOD

(75) Inventor: Satoshi Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/040,969

(22) Filed: Mar. 18, 1998

(30) Foreign Application Priority Data

Mar. 27, 1997 (JP) .................................................... 9-076072

(51) Int. Cl.[7] .............................. H04N 5/76; H04N 5/781
(52) U.S. Cl. ............................................ 386/111; 386/125
(58) Field of Search ........................ 386/33, 45, 111–112, 386/125–126; 714/6, 764, 770; 711/114; 725/114–115, 145, 87, 92, 94, 93; 360/8, 48; 375/240.04, 240.05, 240.06, 240.07; H04N 5/76, 9/79, 5/781, 5/92

(56) References Cited

U.S. PATENT DOCUMENTS

| | | | |
|---|---|---|---|
| 5,809,273 | * 9/1998 | Favor et al. | 712/210 |
| 5,881,279 | * 3/1999 | Lin et al. | 712/244 |
| 5,907,363 | * 5/1999 | Botsford, III et al. | 348/419 |
| 6,029,254 | * 2/2000 | Andrews | 714/6 |
| 6,044,431 | * 3/2000 | Greenwood et al. | 711/5 |
| 6,054,943 | * 4/2000 | Lawrence | 341/87 |
| 6,078,989 | * 6/2000 | Kato et al. | 714/770 |
| 6,101,615 | * 8/2000 | Lyons | 714/6 |
| 6,212,208 | * 4/2001 | Yoneda et al. | 370/538 |

* cited by examiner

Primary Examiner—Thai Tran
(74) Attorney, Agent, or Firm—Philip M. Shaw; Crosby, Heafey, Roach & May

(57) ABSTRACT

To provide an information reproduction apparatus which can consecutively reproduce a plurality of clips of an information material without the need for preparing resources of two channels and without using a special, dedicated encoder a write finish flag generator is provided which sets a write finish flag WF at a time point when writing of a cluster of a certain clip from a recording medium to an information material storage unit is finished in a case where at least part of the last cluster of the preceding clip is invalid data in reproducing the clip, preceding the clip, of an information material supplied from the information material storage unit.

16 Claims, 12 Drawing Sheets

INFORMATION REPRODUCTION APPARATUS AND INFORMATION REPRODUCTION METHOD

BACKGROUND OF THE INVENTION

1. Technical Field of the Invention

The present invention relates to an information reproduction apparatus and an information reproduction method for reading out an information material having a plurality of clips and reproducing the clips of the information material consecutively.

2. Prior Art

In recent years, the techniques of compression-coding image information and audio information with minimum deterioration and then decoding the compressed-coded information material with a reproducing means have been developed. For example, the MPEG (Motion Picture Experts Group) system standard has been proposed as a scheme for compression-coding and then decoding (expanding) image information and audio information. An audio-video material or the like that has been compressed and multiplexed according to the MPEG system standard consists of a plurality of clips as shown in FIG. 12. Each clip consists of a plurality of clusters, four clusters in the example of FIG. 12. A "cluster" is a unit that is an integral multiple of a unit (for instance, 512 bytes) that is formed on a hard disk (HDD) and generally called a sector. The example of FIG. 12 shows two clips, i.e., a certain clip CP2 and a preceding clip CP1.

In the conventional example of FIG. 12, an information material (MPEG stream) 2 having clips CP1, CP2, etc. is recorded on a hard disk (HDD) 1. The information material 2 recorded on the hard disk 1 is to be decoded by a decoder. However, direct access to the information material 2 cannot be effected between the hard disk 1 and the decoder 2. This is because the MPEG stream is recorded on the hard disk 1 so as to be divided into certain units (for example, 4-byte units; hereinafter referred to as cells 1a) and a DMA buffer 3 needs to be used as a buffer for absorbing a size difference between the cell 1a of the hard disk 1 and the cluster CT. That is, in accessing the hard disk 1, the information material 2 needs to be temporarily stored in a buffer 3A or a buffer 3B.

To decode the clusters of the clips CP1 and CP2, for instance, by sending those to decoders 4a and 4b consecutively, a switcher 5 is used as shown in FIG. 12. The first cluster CT1 of the preceding clip CP1 is stored in the buffer 3A and reproduced by a decoder 4a, and the next cluster CT2 is stored in the buffer 3B and decoded by the decoder 4b. The switcher 5 sequentially outputs the clusters CT as a video signal, an audio signal, or the like by switching between the decoders 4a and 4b. As the switcher 5 switches between the decoders 4a and 4b, the clusters CT of the preceding clip CP1 and the clusters CT of the (ensuing) clip CP2 are reproduced consecutively.

However, the above method requires two channels, i.e., a channel CH1 consisting of one buffer 3A and one decoder 4a and a channel CH2 consisting of another set, i.e., the buffer 3B and the decoder 4b. That is, the decoders 4a and 4b of two channels need to be prepared.

There may be conceived a somewhat improved scheme in which a decoder of one channel is prepared and the transfer of the information material 2 from the hard disk 1 is given the ability of two channels. However, in either scheme, the transfer ability resources of two channels are necessarily required for the reproduction of the information material 2 on the hard disk of one channel, resulting in a cost increase.

In view of the above, there has been proposed a scheme for consecutively reproducing a plurality of clips CP1 and CP2 as shown in FIG. 12 by using resources of less than two channels. This scheme is disclosed in Japanese Unexamined Patent Publication No. Hei. 8-289255. The technique disclosed in this publication employs a scheme in which in a state that there exist a certain clip CP2 and the preceding clip CP1 as shown in FIG. 12, their sizes are adjusted so as to be equal to an integral multiple of the cluster size.

For example, where there exists invalid data DD (called dust data) as at least part of the fourth, i.e., last, cluster CT4 of the clip CP1, the following problem arises. For example, when the decoder 4b decodes the last cluster CT4 including the invalid data DD coming from the buffer 3B, only effective data t excluding the invalid data DD is actually readout. If the time necessary to readout the effective data t is, for instance, 0.1 second, an operation of sending the cluster CT4 of the clip CP1 from the buffer 3B to the decoder 4b is performed for 0.1 second. At the same time that the cluster CT4 is being read from the buffer 3B, an operation of reading out the head cluster CT1 of the clip CP2 from the hard disk 1 and supplying it to the buffer 3A is performed. At this time, the time required for reading out the last cluster CT4 and supplying it to the decoder 4b is equal to the 0.1 second that it takes to readout the effective data t and supply it to the decoder 4b, and hence information, corresponding to only 0.1 second, of the head cluster CT1 of the clip CP2 can actually be readout. Therefore, if the time necessary to readout the head cluster CT1 of the clip CP2 and supply it to the buffer 3A is 1 second, only part of the information material 2, corresponding to only 0.1 second, can be readout from the hard disk 1 and supplied to the buffer 3A.

To avoid the above inconvenience, a special, dedicated encoder is necessary which codes a certain clip CP2 and the preceding clip CP1 so as to produce data having completely the same size even if there exists invalid data DD.

SUMMARY OF THE INVENTION

The present invention has been made to solve the above problems, and an object of the invention is therefore to provide an information reproduction apparatus and an information reproduction method which can consecutively reproduce a plurality of clips of an information material without the need for preparing resources of two channels and without using a special, dedicated encoder.

According to the invention, the above object is attained by an information reproduction apparatus for reading out an information material having a plurality of clips and consecutively reproducing the clips of the information material, comprising a recording medium on which an information material having a plurality of clips is recorded, information material storing means, including temporary buffer means, for reading out, upon request and in sequence, a first clip and a second clip of the information material that each consist of a plurality of clusters from the recording medium, and writing the readout clips to the temporary buffer means, write finish flag generating means for setting a write finish flag at a time point when writing of a cluster of the second clip from the recording medium to the temporary buffer means by the information material storing means is finished, information material reproducing means for reproducing the first clip from the temporary buffer means at the same time that the second clip is being written in the temporary buffer means by the information material storing means, and including means for detecting the setting of the write finish flag and pausing reproduction of the first clip until the write finish flag is detected as having been set, so that even in a case where at least part of a last cluster of the first clip is invalid data all of the second clip will be written to the temporary buffer means.

With the above configuration, even if at least part of or all of the last cluster of the preceding clip is invalid data, the information material reproducing means can continue to reproduce the last cluster including the invalid data until setting of the write finish flag. As a result, the time taken to readout a cluster of a certain clip from the recording media and supply it to the information material storing means can be equalized to the time taken to reproduce a cluster of the preceding clip from the information material storing means to the information material reproducing means. Therefore, it is possible to prevent an event that the time for storing a cluster of a certain clip from the recording media to the information material storing means becomes too short and there occurs a portion that cannot be readout for storage.

According to the invention, the above object is attained by an information reproduction apparatus for reading out an information material having a plurality of clips and consecutively reproducing the clips of the information material, comprising a recording medium on which an information material having a plurality of clips is recorded, information material storing means, including temporary buffer means, for reading out, upon request and in sequence, a first clip preceding a second clip of the information material, each clip consisting of a plurality of clusters from the recording medium, and writing the readout clips in the temporary buffer means, information material reproducing means for reproducing, only in response to detection of an effectiveness flag, the first clip of the information material supplied from the information material storing means at the same time that the information material storing means is storing the second clip, and effectuation enabling flag generating means for generating the effectiveness flag if all information of a last cluster of the first clip that constitutes the information material is effective data and not generating the effectiveness flag if at least part of the last cluster of the first clip that constitutes the information material is invalid data.

With the above configuration, when at least part of the last cluster of the preceding clip is invalid data, the effectuation enabling instruction generating means does not generate an effectiveness flag effectuation enabling instruction for enabling effectuation (i.e. decoding) of invalid data by setting the effectiveness flag. Therefore, it becomes known that effective data exists in the last cluster of the preceding clip and hence it is not necessary to set a write finish flag for each cluster, whereby the flag management can be simplified.

The invention further incorporates the methods of operation necessarily embodied by the above described apparatuses.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENTS OF THE INVENTION

Preferred embodiments of the present invention will be hereinafter described in detail with reference to the accompanying drawings.

Since the following embodiments are preferred, specific examples of the invention, they include various limitations that are technically favorable. However, the scope of the invention is not limited to those embodiments unless there is a particular statement, in the following description, to the effect that the invention is so limited.

Figure 1:
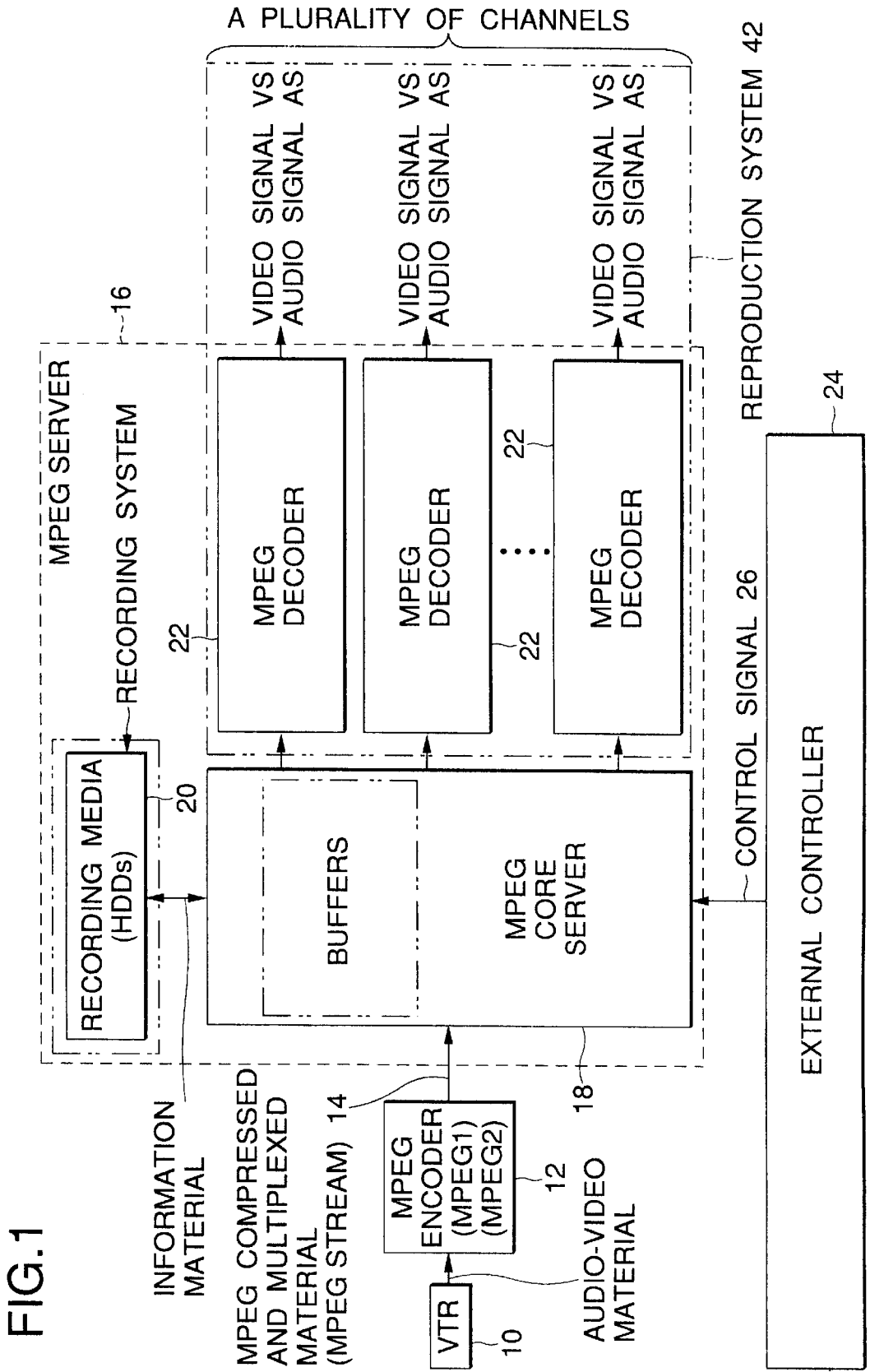
FIG. 1 shows a preferred entire configuration of an information reproduction apparatus according to the invention.
Figure 2:
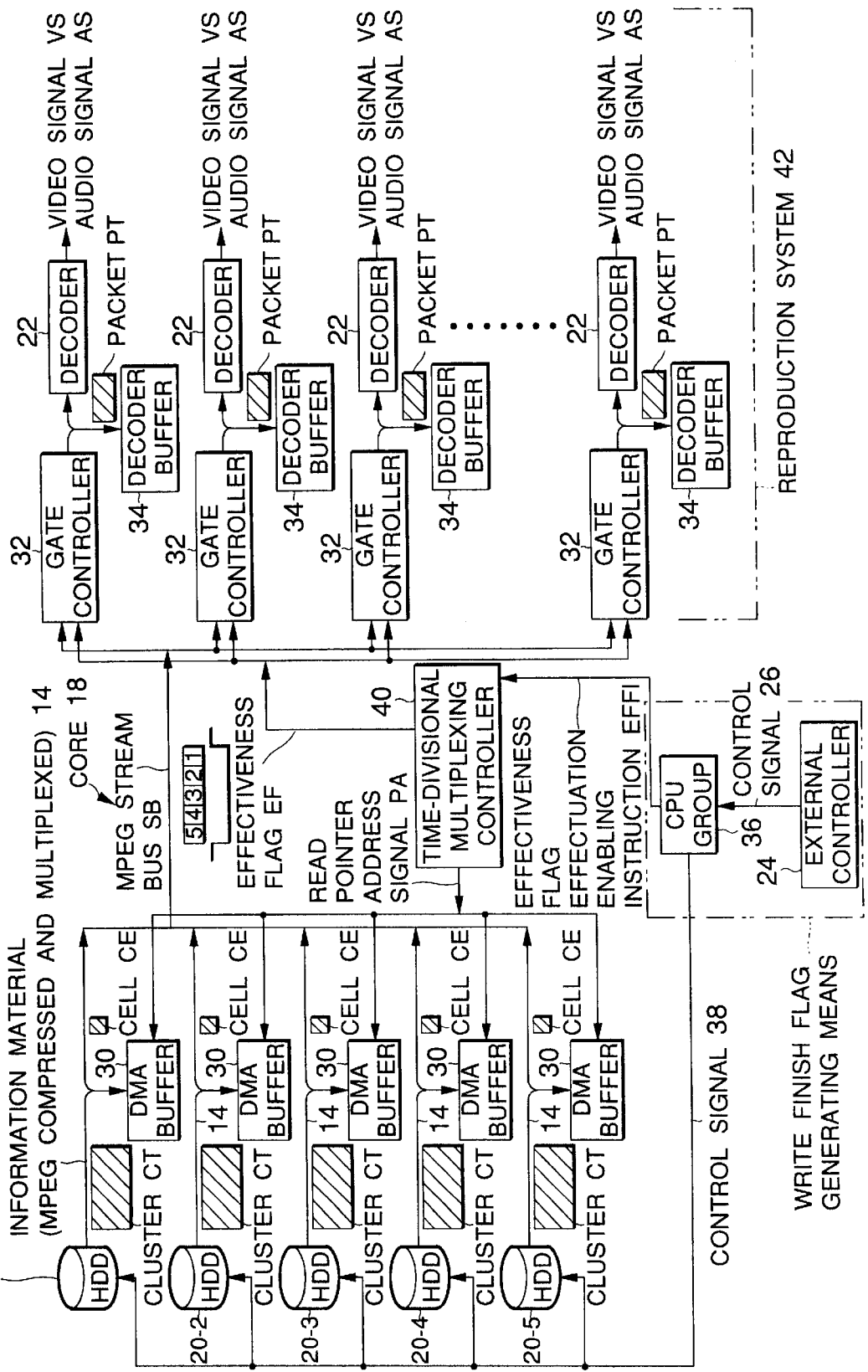
FIG. 2 shows the internal configuration of an MPEG server shown in FIG. 1 and an external controller.

FIG. 1 shows the entire configuration of an information reproduction apparatus according to a preferred embodiment of the invention, and FIG. 2 shows the internal configuration of an MPEG server of the information reproduction apparatus of FIG. 1.

Referring to FIG. 1, the information reproduction apparatus compression-codes an audio-video material sent from, for instance, a video tape recorder (VTR) 10 and reproduces (decodes) the coded material with an MPEG server. More particularly, the video tape recorder 10 is connected to an MPEG encoder 12 which is a compression-coding device. The MPEG encoder codes a video material according to the MPEG2 scheme and codes an audio material according to the MPEG1 scheme or the like. The coded compressed materials are input to a core 18 of the MPEG server 16 as an MPEG compressed and multiplexed material (hereinafter called an information material) according to the MPEG2 system scheme. The information material 14 is also called an MPEG stream.

The MPEG1 scheme, as well as the MPEG2 scheme, is an international standard that has been established by the joint organization of ISO (International Organization for Standardization) and IEC (International Electrotechnical Commission).

Next, the internal configuration of the MPEG server shown in FIG. 1 will be described.

The MPEG server 16 has the above-mentioned MPEG server core (hereinafter abbreviated as a core) 18, a plurality of hard disk drives 20 as a recording system (recording media), and a plurality of MPEG decoders 22 as a plurality of information material reproducing means. The core 18 is connected to the plurality of hard disk drives 20 and the plurality of decoders 22. The core 18 is connected to an external controller 24 which supplies a control signal 26 to the core 18.

The detailed configuration of the MPEG server 16 will now be described with reference to FIG. 2. The core 18 of the MPEG server 16 shown in FIG. 1 records information materials (MPEG compressed and multiplexed materials) 14 onto the hard disk drives 20 in accordance with the control signal 26 supplied from the external controller 24. Further, the core 18 supplies a desired material that is recorded on a hard disc drive 20 to a desired MPEG decoder (hereinafter abbreviated as a decoder) 22 in accordance with a control signal 38 supplied from a CPU group 36 that operates in accordance with the control signal 26 supplied from the external controller 24. Supplied with the information material, the decoder 22 decodes (reproduces) it and outputs a video signal VS and an audio signal AS to the outside.

In FIG. 2, the hard disk drive 20 as the recording media actually has five drives 20-1 to 20-5, each of which is connected to an MPEG stream bus SB via a DMA buffer 30. The stream bus SB is connected to the decoders 22 as the information material reproducing means via gate controllers 32 and decoder buffers 34, respectively.

The hard disk drives 20-1 to 20-5 are supplied with the control signal 38 from the CPU group 36. The hard disks of the hard disk drives 20-1 to 20-5 shown in FIG. 2 are recording media for recording information materials 14 as described above. Each DMA buffer (also called a buffer memory) 30 is a buffer memory for temporarily storing the information material 14 that is readout from the corresponding one of the hard disk drives 20-1 to 20-5. The decoder buffers (also called buffer memories) 34 are memories for temporarily storing information materials that are readout from the DMA buffers 30. The gate controllers 32 are controllers for controlling the writing of information materials 14 to the respective decoder buffers 34. The decoders 22 decode (reproduce) information materials 14 readout from the respective decoder buffers 34.

A time-division multiplexing controller 40 controls the timing of reading out information materials 14 from the DMA buffers 30. The CPU group 36 is a group of central processing units, which can communicate with each other by using a shared memory, for controlling the time-divisional multiplexing controller 40 and the access to the hard disk drives 20-1 to 20-5 by outputting the control signal 38 in response to a request (control signal 26) from the external controller 24 as a host controller.

Having, for instance, the gate controllers 32, the decoder buffers 34, and the decoders 22, the reproduction system (decoding system) 42 shown in FIGS. 1 and 2 can reproduce information materials 14 in the form of, for instance, video signals VS and audio signals AS on a plurality of channels corresponding to the number of decoders 22. To reproduce information materials 14 on many channels, it is necessary to increase the ability of supplying the information materials 14 from the plurality of hard disk drives 20-1 to 20-5. To this end, the plurality of (five in the example of FIG. 2) hard disk drives 20-1 to 20-5 are used in parallel.

Figure 11:
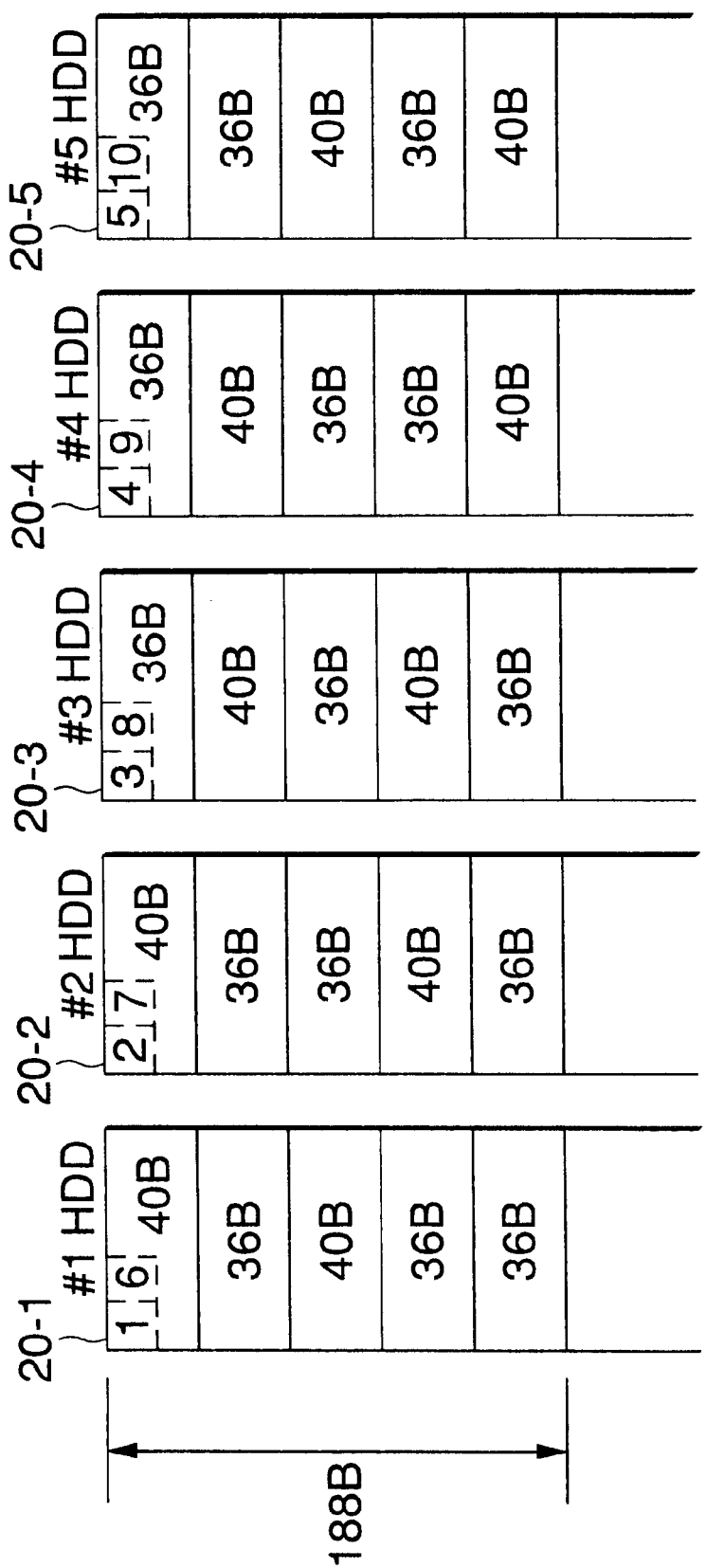
FIG. 11 shows an example of hard disk drives.
Figure 12:
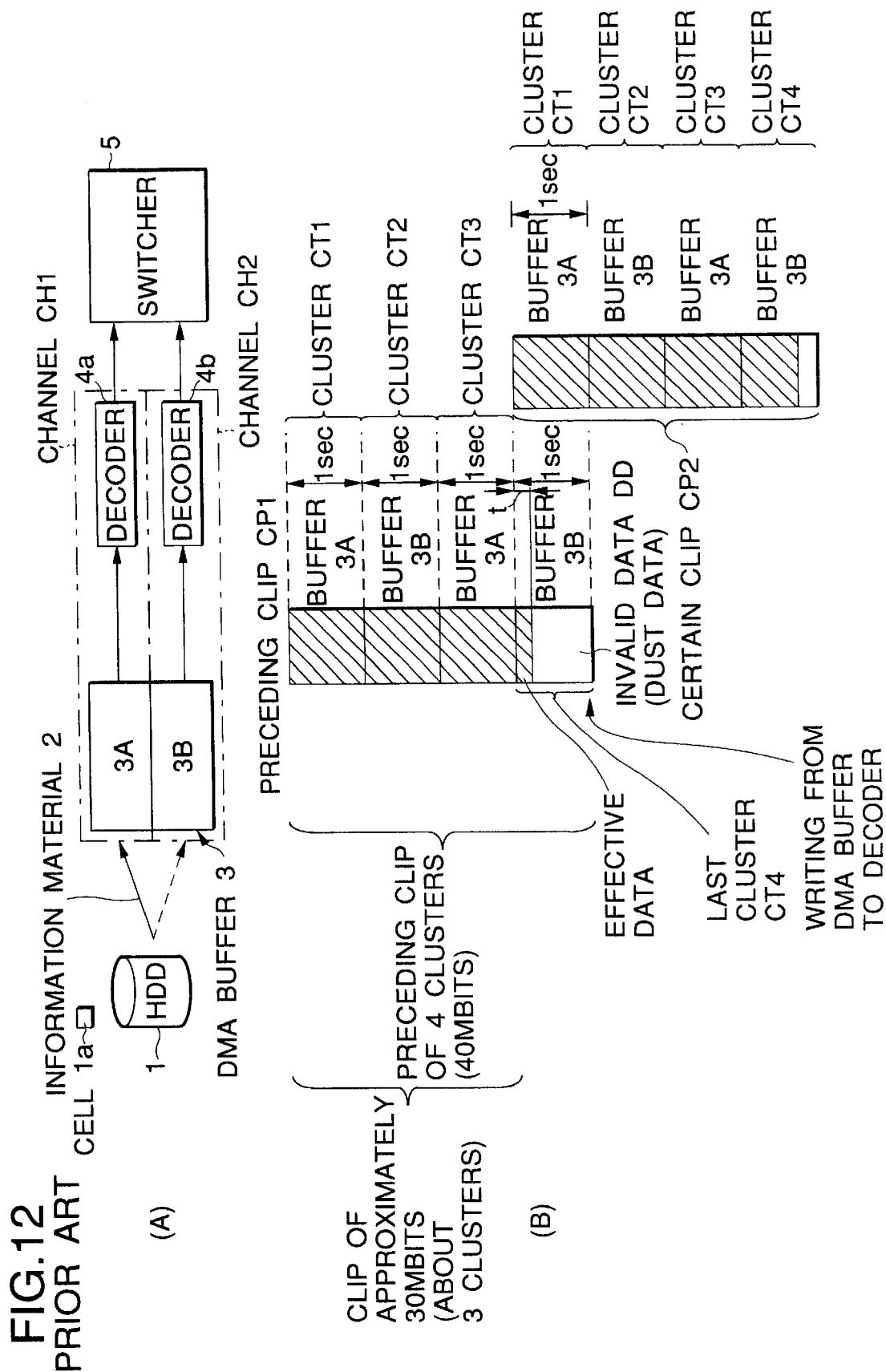
FIG. 12 shows a conventional example of connection between a hard disk, a DMA buffer, and decoders as well as example data of a certain clip and the preceding clip.

Information materials 14 are supplied from the MPEG encoder 12 so as to be divided into certain units (for instance, 4 bytes, hereinafter called cells CE) and recorded onto the hard disks of the hard disk drives 20-1 to 20-5 shown in FIG. 2. FIG. 11 shows an example of the hard disks of the hard disk drives 20-1 to 20-5. Recording proceeds in such a manner that the head 4-byte cell is recorded onto the first hard disk drive 20-1 and the next 4-byte cell is recorded on the second hard disk drive 20-2.

However, the hard disks of the hard disk drives 20-1 to 20-5 can only be accessed in units (i.e., clusters CT shown in FIG. 2) of integral multiples of the unit generally called the sector (for example, 512 bytes). To absorb the difference between the information sizes of the cell CE and the cluster CT, the DMA buffers 30 are used as shown in FIG. 2. That is, in accessing the hard disk drives, information materials 14 are temporarily stored in the DMA buffers 30.

Now, the terms will be described below briefly.

The term "sector ST" means a "physical" minimum accessible unit of a recording medium such as a hard disk or a floppy disk. It consists of an ID section (address information or the like), a data section, an error correcting code, etc. In general, the sector size means the size of only the data section, which is usually 512 bytes. The term "cluster CT" means a unit that is an integral multiple of the sector and is a "logical" minimum accessible unit of a recording medium such as a hard disk or a floppy disk. Therefore, each cluster consists of consecutively arranged sectors. The number of sectors that constitute one cluster depends on the kind of recording medium, its size, and other factors. For example, in the case of a floppy disk, one or two sectors usually constitute one cluster. In the case of a hard disk, one cluster is constituted of one of various numbers of sectors such as 4, 8, and 16 sectors. As the number of sectors constituting one cluster decreases, the total number of clusters constituting one recording medium increases and hence the number of places of an address necessary to specify a cluster increases. Therefore, in general, a recording medium of a larger size has a larger number of sectors constituting one cluster. In general, the cluster size is represented by the data section size of sectors constituting a cluster multiplied by the number of sectors.

Further, the term "packet PT" indicates a unit that can be handled by a decoder and means a minimum unit of components used in multiplexing, according to the MPEG system standard, video data and audio data that have been coded (compressed) according to the MPEG standard. The packet PT is a minimum unit of components of an information material 14 when it is sent from a decoder buffer 34 to the associated decoder 22 (see FIG. 2). In other words, compressed video data and audio data are each divided into units called packets and then multiplexed at a proper ratio (for example, one audio packet per 10 video packets). In general, the packet size means the total size including not only the size of a data section (called a payload) but also the size of control codes. According to the MPEG system standard, the packet size is arbitrary in the case of a program stream intended for use mainly in storage media and is 188 bytes in the case of a transport stream intended for use mainly in communication or broadcasting media.

The control signal 26 that is generated by the external controller 24 is supplied to the CPU group 36. The external controller 24 and the CPU group 36 serve as a write finish flag generating means for generating a write finish flag (described later) and as an effectuation enabling instruction generating means which can generate and stop generating an effectiveness flag effectuation enabling instruction (described later).

The time-divisional multiplexing controller 40 shown in FIG. 2 can supply a read pointer address signal PA and an effectiveness flag EF to the DMA buffers 30 and the gate controllers 32, respectively. The reason why the time-divisional multiplexing controller 40 supplies the effectiveness flag EF to the gate controllers 32 is as follows.

The main function of the time-divisional multiplexing controller 40 is to control reading of information materials from the DMA buffers 30 so as to cause a desired information material 14 to flow through the MPEG stream bus SB at a desired time point. Each cell CE (4 bytes) of information materials (MPEG stream) 14 that have been readout from the respective DMA buffers 30 are stored in the decoder buffers 34 in such a manner that the data of a number equal to the number (5) of parallel hard disk drives 20-1 to 20-5 (4 bytes×5) are made as one set. The information materials 14 stored in the decoder buffers 34 are processed and reproduced by the respective decoders 22 in due course.

At this time, because of the time-divisional multiplexing by the time-divisional multiplexing controller 40, certain data always flows through the MPEG stream bus SB. That is, data of an information material 14 would undesirably flow toward even a gate controller 32 corresponding to a channel not relating to the current reproduction at a time point allocated to the channel.

In view of the above, to cause only effective information materials 14 (i.e., information materials that are desired to be used) to be captured by the corresponding decoder buffers 34, the time-divisional multiplexing controller 40 supplies effectiveness flags EF to the corresponding gate controllers 32. The gate controllers 32 are rendered effective by the effectiveness flag even while no data flows through the MPEG stream bus SB. This flag is used to perform timing adjustments to allow data to be passed through the gate controller 32 and then decoded only while the decoder side is ready. The effectiveness flag effectuation enabling instruction ("EFEEI") from the CPU Group 36 is thus:

SET→Effective Data

NOT SET→Invalid Data (i.e. "dust data").

As a result, an information material 14 flowing at a certain time point is effective with respect to the corresponding gate controller 32 only when the effective flag EF is set (at the low level), and the gate controller 32 allows the corresponding decoder buffer 34 to capture the information material 14. The generation of the effective flag EF is another important role of the time-divisional multiplexing controller 40.

Figure 3:
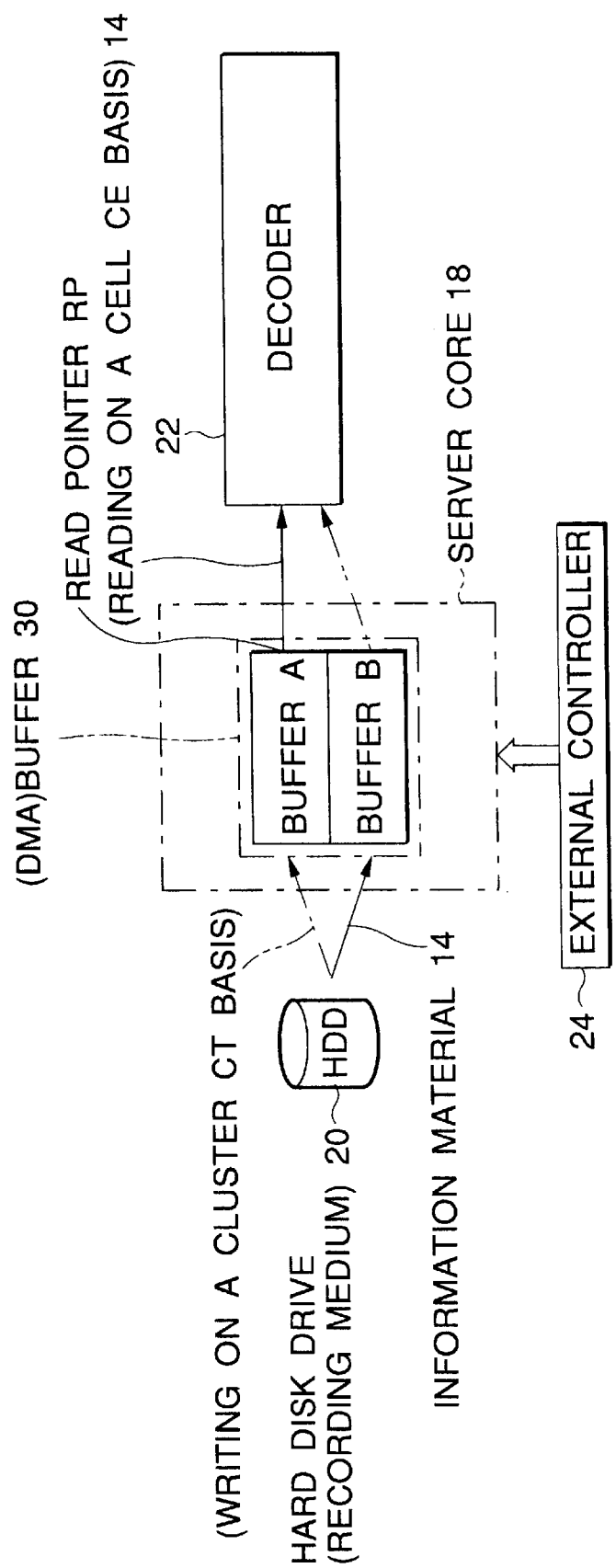
FIG. 3 shows an example of a connection relationship between a recording medium, a DMA buffer shown in FIG. 1 and a decoder.

Next, an exemplary configuration of the DMA buffer 30 will be described with reference to FIGS. 2 and 3. FIG. 3 shows an exemplary connection between the DMA buffer 30 (serving as an information material storing means), the hard disk drive 20 (one of 20-1 to 20-5) as a recording medium, and the MPEG decoder 22 (serving as an information material reproducing means).

The information material 14 is written from the hard disk drive 20 to the DMA buffer 30 on a cluster CT basis. On the other hand, the information material 14 is readout from the DMA buffer 30 and supplied to the decoder 22 on a cell CE basis. The DMA buffer 30 has two ring-buffer-type buffers A and B. That is, while an information material 14 is readout from one buffer (say, buffer A) and supplied to the decoder 22, an information material 14 is written from the hard disk drive 20 to the other buffer (say, buffer B). When the reading of the information material 14 from buffer A has been finished, subsequently the information material 14 is readout from buffer B and during this time new information material 14 is written from the hard disk drive 20 to buffer A.

The above operation is thereafter repeated in a similar manner, whereby information materials 14 can be sent sequentially from the hard disk drive 20 to the decoder 22. Data of an information material 14 is transferred from the hard disk drive 20 to the DMA buffer 30 in a burst-like manner on a cluster CT basis, and it is transferred from the DMA buffer 30 to the decoder 22 constantly on a cell CE basis.

If writing to buffer B has not been finished before reading from buffer A is completed, there occurs a possibility that invalid data (what is called dust data) DD is readout. It is necessary to prevent such an event. To this end, with an assumption that the minimum time taken to consume (read from the DMA buffer) one data cluster of an information material 14 is, say, one second, it is necessary to enable data of an information material 14 to be readout from the hard disk drive 20 and supplied to the DMA buffer 30 once per second.

Therefore, in actual designing, the number of parallel hard disk drives 20, the maximum number of channels to be supported, and other parameters are determined so as to satisfy the above condition. In the embodiments of the invention, it is assumed that the parameters are set so as to satisfy the above condition.

Figure 10:
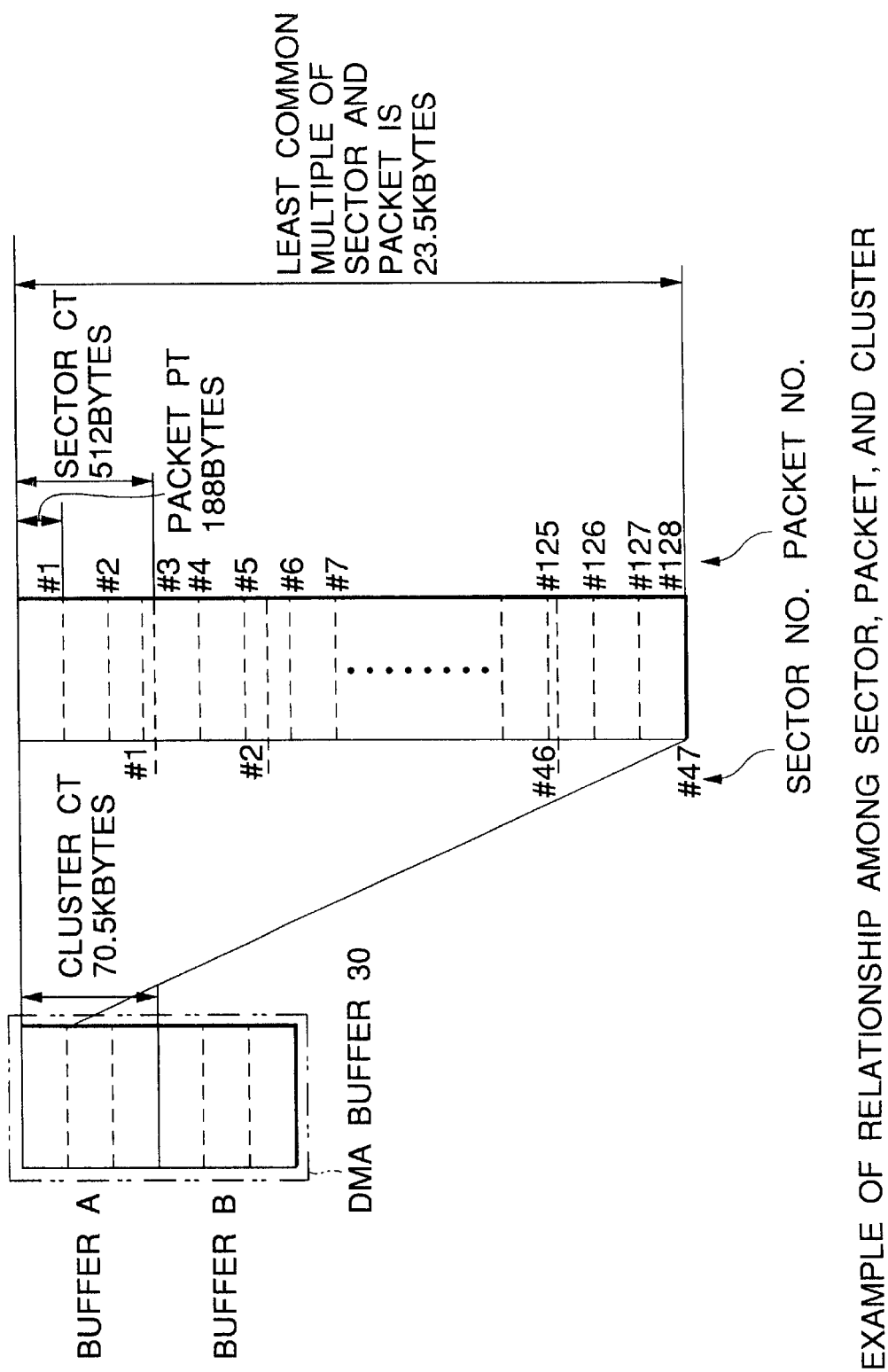
FIG. 10 shows an example of the relationship among the sector, the packet, and the cluster.

FIG. 10 shows an exemplary relationship among the cluster CT, the packet PT and the sector CT. Referring to FIG. 10, for example, if it is assumed that one sector is 512 bytes and one packet amounts to 188 bytes, the least common multiple of the sector and the packet is 128 packets:

$$24064 = 23.5 \text{ Kbytes}$$
$$= 47 \text{ sectors}$$
$$= 128 \text{ packets}$$

If it is assumed that one cluster is three times the least common multiple, one cluster amounts to 384 packets:

$$70.5 \text{ Kbytes} = 141 \text{ sectors}$$
$$= 384 \text{ packets}$$

DMA buffer 30 access sequence (non-consecutive reproduction scheme)

Before describing an information reproduction method according to the invention with reference to FIGS. 7 and 8, an access sequence, focused on the DMA buffer 30, relating to a clip information reproduction method (non-consecutive reproduction method) so far used ordinarily will be described as a basis with reference to FIG. 4.

Figure 4:
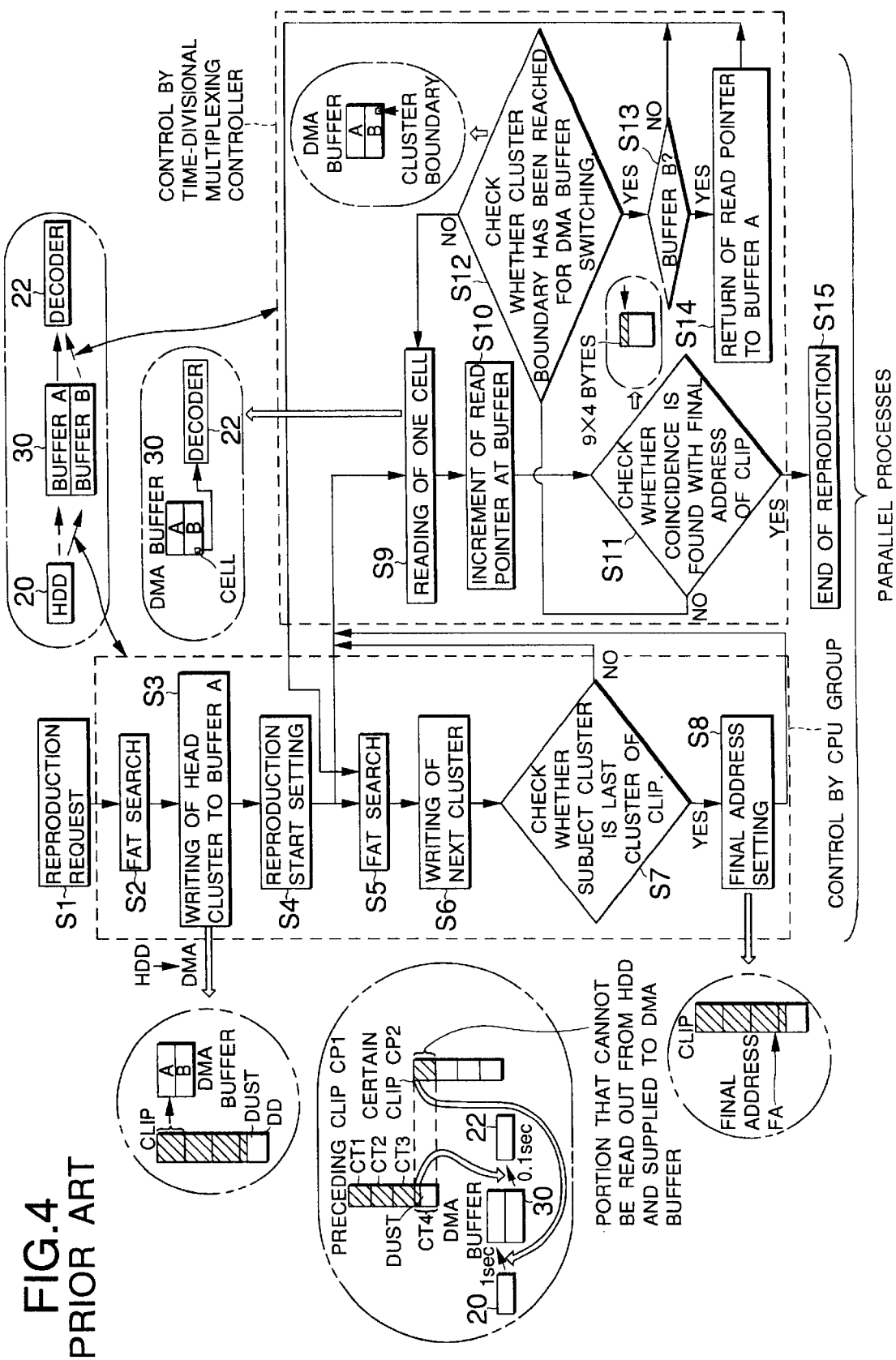
FIG. 4 shows a conventional DMA buffer access sequence (clips non-consecutive reproduction scheme) as a comparative example for description of an information reproduction method according to the invention.

FIG. 4 shows a DMA buffer 30 access sequence used in a case (non-consecutive reproduction) where a certain clip CP2 and the preceding clip CP1 (see FIGS. 4 and 10) are not reproduced consecutively. Here, a description will be made of an example structure of a certain clip CP2 and the preceding clip CP1. The preceding clip CP1 has four clusters CT1–CT4, each having a data width of about one second, for instance. However, at least part of the fourth cluster CT4 is invalid data DD. Similarly, the (next) clip CP2 has four clusters CT1–CT4, all of which is valid data.

It is to be understood that the following steps S2–S8 are to be executed by the CPU group 36 after reception of the reproduction request from the external controller 24 and the steps S9–S15 are to be executed by the time-divisional multiplexing controller 40 and may be executed simultaneously with the execution of the steps S2–S8.

Step S1: A request (control signal 26) for reproducing a certain clip on a certain channel of the reproduction system 42 (see FIG. 2) is issued from the external controller 24 (see FIG. 1) as a host controller to the CPU group 36.

Step S2: The address of the head cluster of a specified clip is checked by searching a FAT (file allocation table). The FAT is a kind of database for managing recording locations (addresses), on a HDD, of respective clusters as components of each clip.

Step S3: Data of the head cluster CT1 of the preceding clip CP1 (see FIG. 10) is written from the HDD 20 to the DMA buffer 30.

Step S4: The CPU group 36 sets the time-divisional multiplexing controller 40 so that reproduction is started on a specified channel beginning at a step S9.

Step S9: Data of one cell CE is readout from the DMA buffer 30 (see FIG. 3) at an address indicated by a read pointer RP.

Step S10: The read pointer RP is incremented.

Step S11: It is checked whether the read pointer RP coincides with a final address FA (i.e., an address before invalid data DD of the preceding clip CP1).

Step S12: If the read pointer RP does not coincide with the final address FA at step S11, it is checked at step S12 whether the read pointer RP has reached a cluster boundary. If the read pointer RP has not reached a cluster boundary yet, the process returns to step S9.

If informed by the time-divisional multiplexing controller 40 that the read pointer RP has reached a cluster boundary in the following steps S13 and S14, the CPU group 36 again executes step S5 onward. The read pointer RP is a pointer that indicates a location (address) of the DMA buffer 30 at which reading is performed.

Step S13: If the read pointer RP has reached a cluster boundary at step S12, it is checked at step S13 whether the cluster boundary is a cluster boundary of buffer B. If it is not a cluster boundary of buffer B, the time-divisional multiplexing controller 40 informs the CPU group 36 that the read pointer RP has reached a cluster boundary and the process returns to step S5.

Step S14: If the cluster boundary is a cluster boundary of buffer B, the read pointer RP is returned to the head of buffer A. The time-divisional multiplexing controller 40 informs the CPU group 36 that the read pointer RP has reached a cluster boundary and the process returns to step S5.

Step S15: If the read pointer RP coincides at step S11 with the final address, the reproduction is finished.

Step S5: The address of the next cluster of the specified clip is checked by searching the FAT.

Step S6: Data of the next cluster is written from the HDD 20 to the DMA buffer 30.

Step S7: It is checked whether this cluster is the last cluster CT4 of the specified clip (preceding clip) CP1. If not, the process returns to step S9.

Step S8: If it is the last cluster CT4, a final address FA is set. The process then returns to step S9. Since the size of each clip is not necessarily equal to an integral multiple of the cluster size, the last cluster CT4 may have invalid data DD (dust data) after a certain address, which is called "final address FA." Values of the final addresses FA of the respective clips are managed by the CPU group 36 as a database in the same manner as the FAT.

The above-described processes of the CPU group 36 and the time-divisional multiplexing controller 40 are parallel ones. The above-described DMA buffer 30 access sequence shown in FIG. 4 is of what is called a non-consecutive reproduction scheme in which the preceding clip CP1 and CP2 are processed on a clip-by-clip basis.

Figure 5:
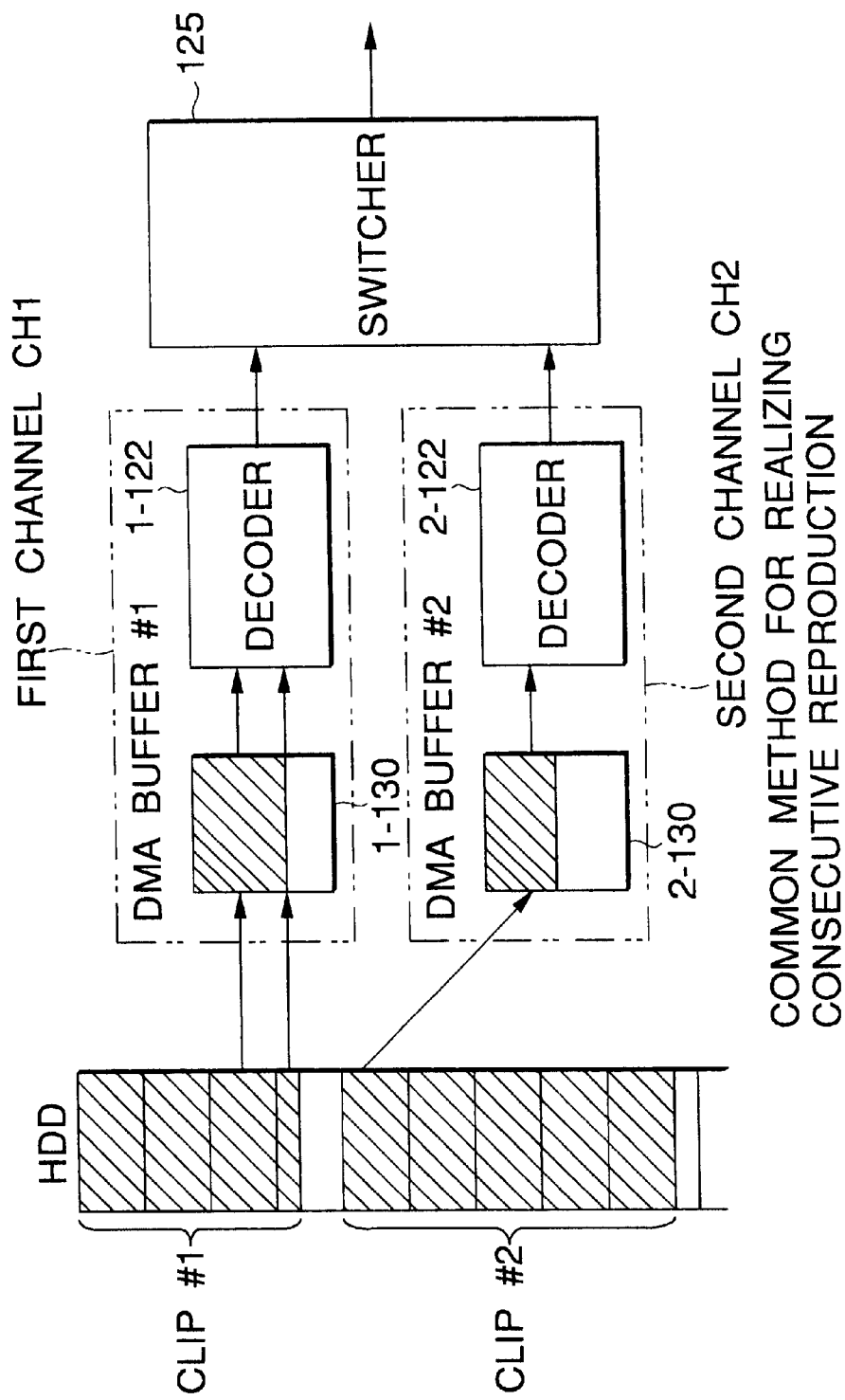
FIG. 5 shows a common method, as a comparative example for description of the invention, for realizing consecutive reproduction.

Next, a common method, as a comparative example, of reproducing a certain clip CP2 and the preceding clip CP1 consecutively rather than reproducing them one by one in the above-described manner will be described with reference to FIG. 5. To realize consecutive reproduction of a certain clip CP2 and the preceding clip CP1 (see FIG. 9), it is necessary to prepare two channels, i.e., a first channel CH1 and a second channel CH2, as shown in FIG. 5 to perform reproduction of a 1-channel amount. Although in FIG. 5 the first channel CH1 and the second channel CH2 are drawn in a simplified manner, each decoder 122 includes a decoder buffer 34 and a gate controller 32 in the same manner as illustrated in FIG. 3.

The two channels, i.e., the first and second channels CH1 and CH2, are necessary for the following reason. It is necessary to select between outputs with a switcher 125 at a connecting point of a certain clip and the preceding clip. For example, to consecutively reproduce three clips, i.e. clip 1, clip 2, and clip 3 in this order, clip 1 and clip 3 are reproduced by DMA buffer 1-130 and MPEG decoder 1-122 and clip 2 is reproduced by DMA buffer 2-130 and MPEG decoder 2-122.

Usually there occurs no problem because data writing of the next cluster from the HDD should be completed while data is readout from a buffer (one second). However, in the case of the last cluster, since it is not always the case that all data is effective (invalid data DD may exist), there may occur an event that data reading from a buffer does not take one second and hence writing of the next cluster, i.e., the head cluster of the next clip, from the HDD is not completed yet.

Therefore, it is necessary to simultaneously perform writing of the last cluster of clip 1 and writing of the head cluster of the clip 2. Therefore, the writing from the HDD needs a data transfer ability of two channels. Even in a hypothetical case where DMA buffer 1-130 and DMA buffer 2-130 are commonized, data transfer ability of two channels is still necessary.

Method for realizing consecutive reproduction by high-speed access scheme

Figure 6:
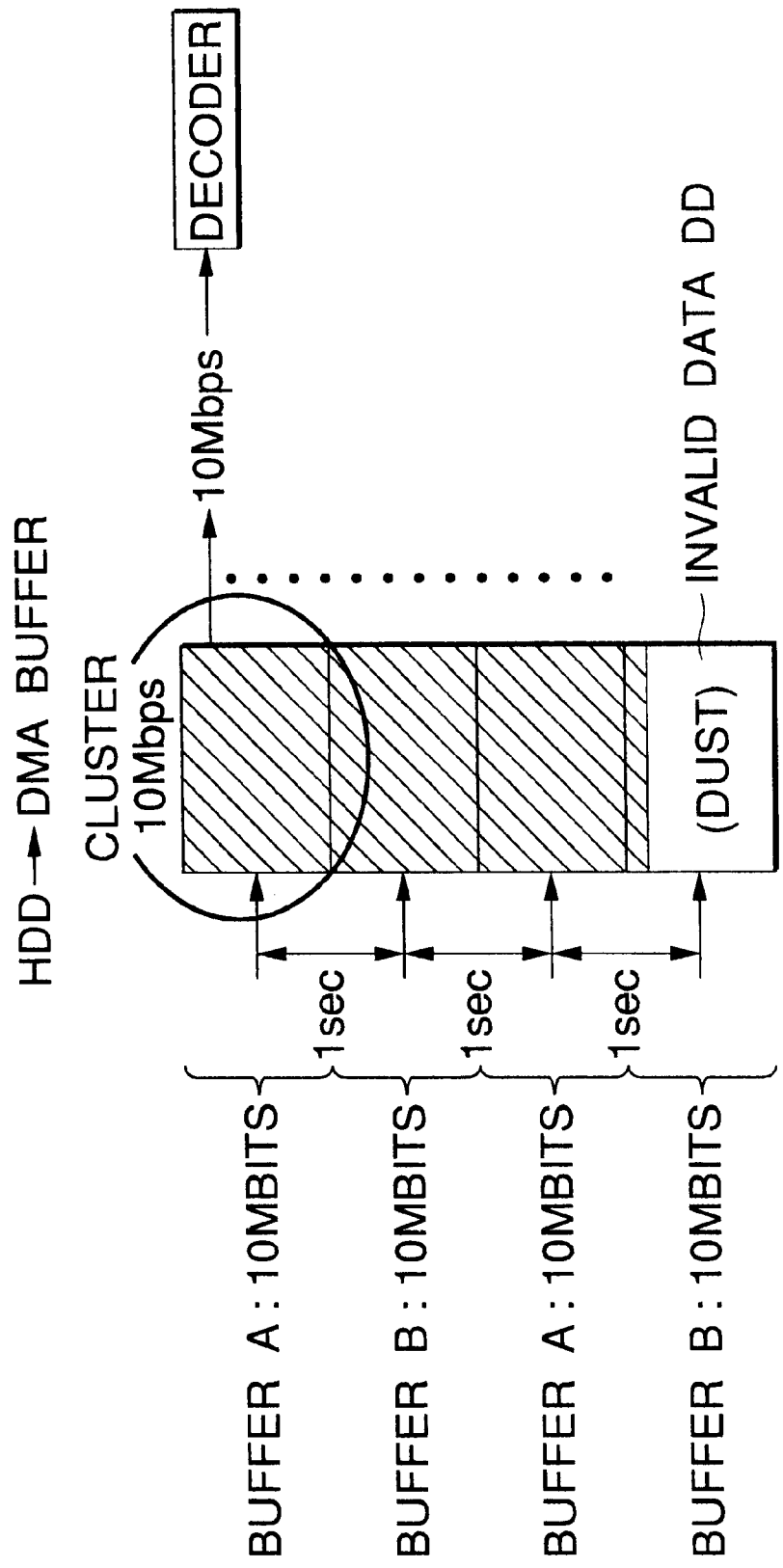
FIG. 6 shows a method for realizing consecutive reproduction by a high-speed access scheme.

FIG. 6 shows the behavior of a DMA buffer in the case of a high-speed access scheme according to the invention. Although FIG. 6 is drawn in such a manner that there are buffers for four clusters, actually there exist buffers for only two clusters. For convenience, FIG. 6 is drawn in a consecutive manner as if for all clusters the same buffer that is used at a different time point were a separate buffer. That is, FIG. 6 shows, from the top, buffer A, buffer B, buffer A at the next time point, and buffer B at the next time point.

To provide an example of numerical values, assume that the size of each cluster is 10 Mbits and there is a supply ability capable of writing data of one cluster from the HDD once per second. Therefore, it is possible to readout data from the DMA buffer at a maximum transfer rate of 10 Mbps. It is also assumed that one clip consists of four clusters.

Figure 9:
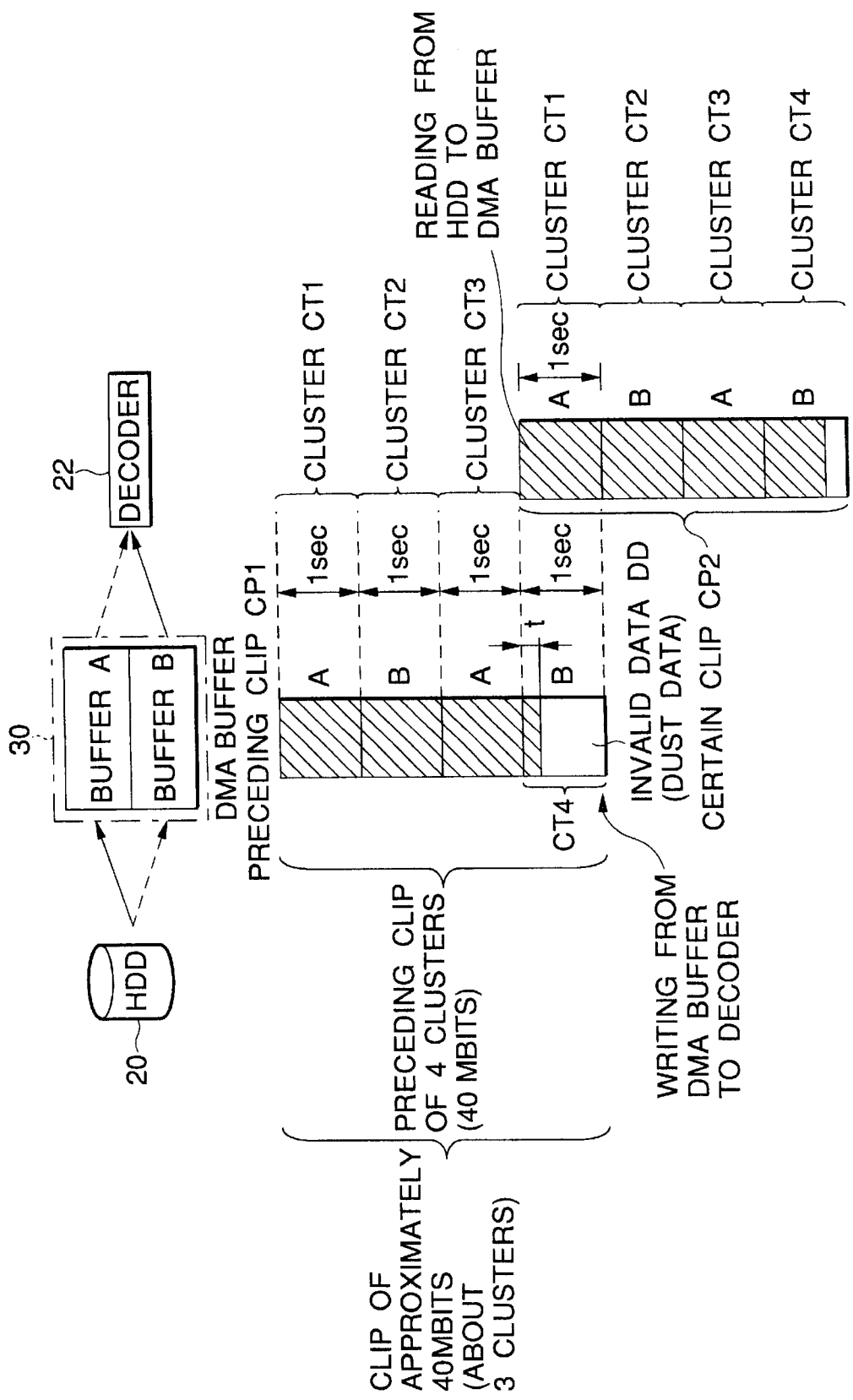
FIG. 9 shows a relationship between a hard disk drive, a DMA buffer, and a decoder as well as example data of a certain clip and the preceding clip.

As shown in FIG. 9, in the worst case, that is, in a case where the entire last cluster is invalid data DD (although correctly at least one cell is effective, the entire cluster is approximately regarded as dust), the total amount of readout effective data is 30 Mbits (=10 Mbits×3 clusters) and the total amount of readout data including dust data is 40 Mbits (=10 Mbits×4 clusters). Since it takes 4 seconds to write this amount of data to the DMA buffer, the DMA buffer does not fail if it is allowed to consume 4 seconds to reading therefrom. That is, if writing to buffer A proceeds ahead of reading from it by one second at the beginning, the difference of one second is maintained permanently even if any number of clips of the above kind are reproduced consecutively. On the other hand, in the case of the last cluster at least part of which is invalid data DD, if reading of data of the last cluster from the DMA buffer to the decoder is finished in less than 4 seconds, the difference of one second between writing and reading is no longer assured and the DMA buffer fails in due course.

To allow consumption of 4 seconds for reading, the rate of time consumption on the decoder side, i.e., the clip bit rate, should be 7.5 Mbps (=30 Mbits÷4 seconds) or less. In other words, if data is readout from the DMA buffer 30 and supplied to the decoder 22 at 10 Mbps, clips of a maximum bit rate 7.5 Mbps can be reproduced consecutively. Thus, a method for solution is, with an assumption that the read/write time of one cluster is fixed at one second, to vary a transfer rate SP1 of writing the last cluster of the preceding clip CP1 from the DMA buffer B to the decoder in accordance with a read rate SP2 of reading out the first cluster of the clip CP2 from the HDD and supply it to the DMA buffer.

In this case, the required data supply ability is of 1.33 channels (=10 Mbps÷7.5 Mbps) which is smaller than 2 channels. This value increases as the number of clusters constituting one clip decreases, and is equal to two (channels) in the worst case where one clip consists of two clusters. Although consecutive reproduction cannot be attained if one clip consists of one cluster, this is due to the fact that the cluster size is inappropriate for clips to be handled. In practice, the shortest clip (for example, 15 seconds for commercial messages) is determined for each purpose, and the cluster size is determined so that even the shortest slip consists of a plurality of clusters.

Next, a DMA buffer 30 access sequence of an information reproduction method according to an embodiment of the invention will be described with reference to FIG. 7 as well as FIGS. 3 and 9. A DMA 30 access sequence (consecutive reproduction, invalid data non-readout scheme) will now be described with reference to FIGS. 7 and 9, in which the external controller 24 and the CPU group 36 (see FIGS. 1 and 3) serve as a write finish flag generating means.

Incidentally, in a DMA buffer 30 access sequence (consecutive reproduction, invalid data readout scheme; see FIGS. 8 and 9), the external controller 24 and the CPU group 36 (see FIGS. 1 and 3) serve as an effectuation enabling instruction generating means (described later) for generating, for invalid data, an effectiveness flag effectuation enabling instruction to render data effective by setting an effectiveness flag.

DMA buffer 30 access sequence (consecutive reproduction, invalid data non-readout scheme)

Figure 7:
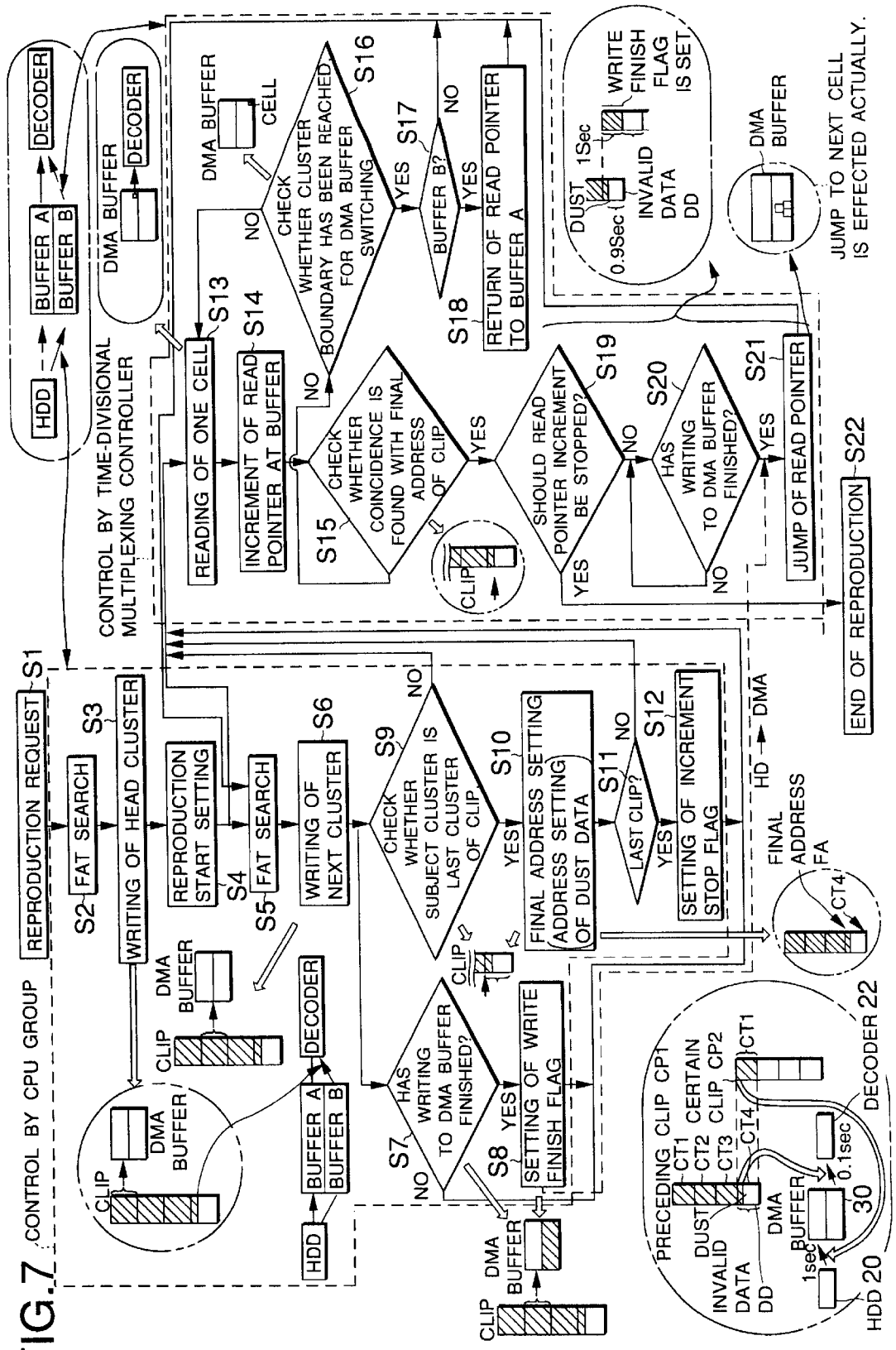
FIG. 7 shows an information reproduction method (first preferred embodiment) according to the invention, i.e., a DMA buffer access sequence (clips high-speed consecutive reproduction, invalid data non-readout scheme).
Figure 8:
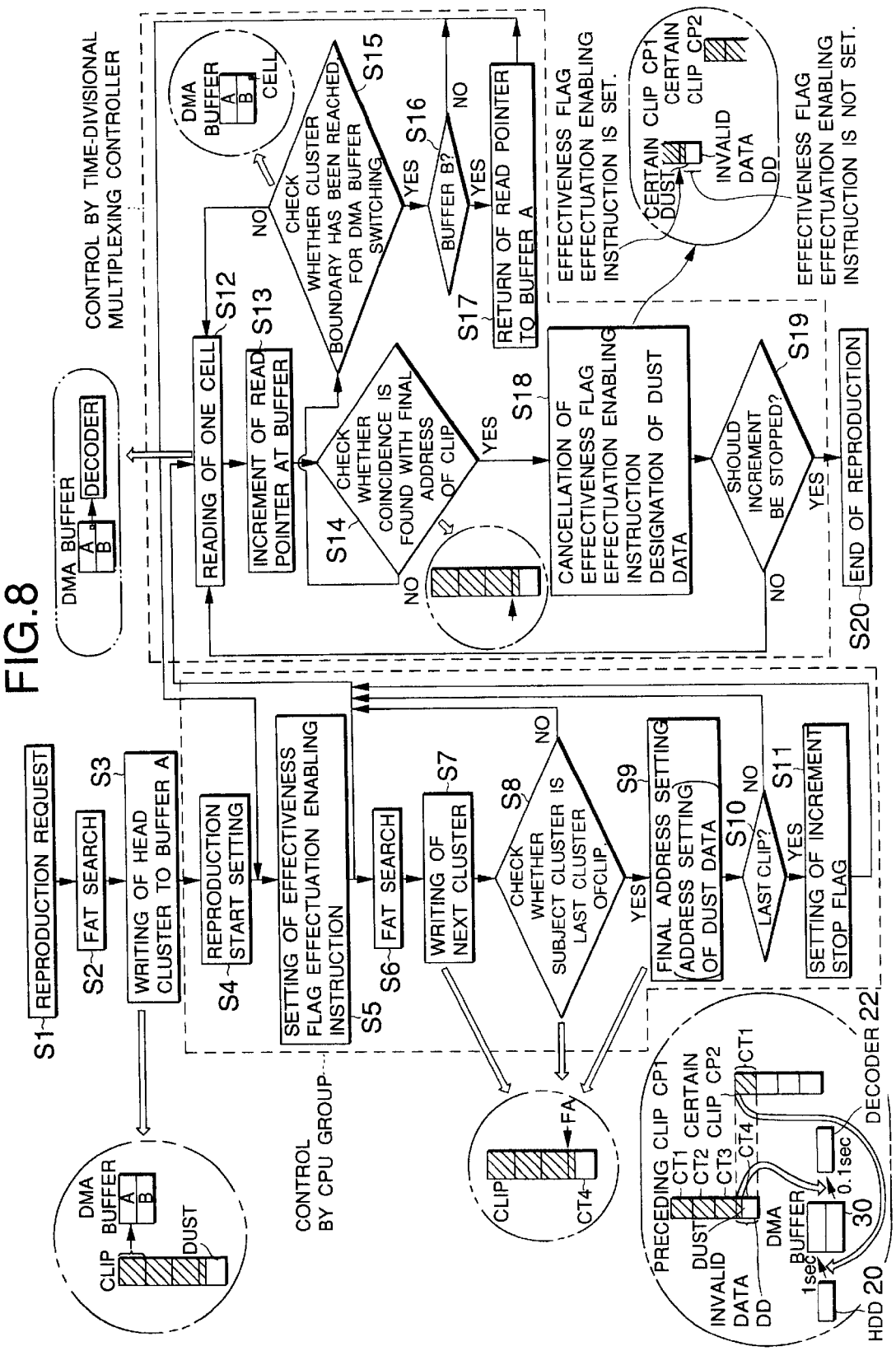
FIG. 8 shows an information reproduction method (second preferred embodiment) according to the invention, i.e., a DMA buffer access sequence (clips high-speed consecutive reproduction, invalid data readout scheme).

FIGS. 7 and 8 are flowcharts of DMA buffer access sequences for consecutive reproduction of clips. The former is a case where invalid data is not readout from the buffer (invalid data non-readout scheme), and the latter is a case where invalid data is readout (invalid data readout scheme). First, the invalid data non-readout scheme (first embodiment) will be described with reference to FIG. 7.

Step S1: A request for reproducing a certain clip on a certain channel (see FIG. 2) is issued from the external controller 24 to the CPU group 36. The following steps S2–S12 are to be executed by the CPU group 36 after reception of the reproduction request from the external controller 24.

Step S2: The address of the head cluster of a specified clip is checked by searching a FAT (file allocation table). The FAT is a kind of database for managing recording locations (addresses), on a HDD, of respective clusters as components of each clip.

Step S3: Data of the head cluster CT1 (see FIG. 9) is written from the HDD 20 to the DMA buffer 30.

Step S4: The CPU group 36 sets the time-divisional multiplexing controller 40 so that reproduction is started on a specified channel and the process proceeds to steps S13.

The following steps S13–S21 are to be executed by the time-divisional multiplexing controller 40 after reception of the reproduction request from the CPU group 36 at step S4.

Step S13: Data of one cell is readout from the DMA buffer 30 (see FIG. 3) at an address indicated by a read pointer RP.

Step S14: The read pointer RP is incremented.

Step S15: It is checked whether the read pointer RP coincides with a final address FA.

Step S16: If the read pointer RP does not coincide with the final address FA at step S15, it is checked at step S16 whether the read pointer RP has reached a cluster boundary. If the read pointer RP has not reached a cluster boundary yet, the process returns to step S13.

Step S17: If, at step S16, the read pointer RP has reached a cluster boundary, it is checked at step S17 whether the cluster boundary is a cluster boundary of buffer B. If it is not a cluster boundary of buffer B, the time-divisional multiplexing controller 40 informs the CPU group 36 that the read pointer RP has reached a cluster boundary and the process returns to step S5.

Step S18: If it is determined at step S17 that the cluster boundary is a cluster boundary of buffer B, the read pointer RP is returned to the head of buffer A. The time-divisional multiplexing controller 40 informs the CPU group 36 that the read pointer RP has reached a cluster boundary and the process returns to step S5.

Step S19: If, at step S15, the read pointer RP coincides with the final address FA, it is checked whether an "increment stop flag" is set.

Step S20: If the increment stop flag is not set, the process waits until setting of a "write finish flag," indicating that writing to the DMA buffer 30 has finished.

Step S21: If the write finish flag has been set, the read pointer RP is jumped to the head of the next cluster and the process resumes at step S5.

Step S22: If, at step S19, the increment stop flag is set, the reproduction is finished.

Step S5: The address of the next cluster of the specified clip is checked by searching the FAT.

Step S6: Data of the next cluster is written from the HDD 20 to the DMA buffer 30.

Step S7: It is checked whether the writing to the DMA buffer 30 has been finished. If not, the process returns to step S13.

Step S8: If the writing has been finished, a "write finish flag WFF" is set and the process returns to step S13.

Step S9: After step S6, it is checked whether this "next cluster" is the last cluster CT4 of the specified clip (preceding clip) CP1. If not, the process returns to step S13.

Step S10: If it is the last cluster CT4, a final address FA is set.

Step S11: Following step S10, it is checked whether this clip is the last clip of a specified clip group.

Step S12: If it is the last clip, the increment stop flag is set and the process returns to step S13.

As described above, the DMA buffer 30 access sequence (invalid data non-readout scheme) of FIG. 7 proceeds as follows. In reproducing a clip CP1, preceding a certain clip CP2, of an information material 14 coming from the DMA buffer 30, in a case where at least part of the last cluster CT4 of the preceding clip CP1 is invalid data DD, the external controller 24 and the CPU group 36 that serve as a finish flag generating means sets the write finish flag WFF at a time point when writing from the hard disk drive (recording medium) to the DMA buffer 30 is finished.

Even if at least part of or all of the last cluster of the preceding clip is invalid data, the information material reproducing means can continue (due to step S20) to reproduce the last cluster including the invalid data until setting of the write finish flag WFF. As a result, the time taken to readout a cluster of a certain clip from the recording medium (HDD20) and supply it to the information material storing means (core server 18) can be equalized to the time taken to reproduce a cluster of the preceding clip from the information material storing means to the information material reproducing means (decoders 22). Therefore, it is possible to prevent an event that the time for storing a cluster of a certain clip from the recording medium to the information material storing means becomes too short and there occurs a portion that cannot be readout for storage.

DMA buffer 30 access sequence (consecutive reproduction, invalid data readout scheme)

Referring now to FIG. 8, the invalid data readout scheme, i.e., an information reproduction method according to a second embodiment of the invention, will be described. This scheme uses an effectiveness flag EF and an effectiveness flag effectuation enabling instruction EFEEI (see also FIGS. 2 and 3).

Step S1: A request for reproducing a certain clip on a certain channel is issued from the external controller 24 to the CPU group 36.

The steps S2–S11 described below are to be executed by the CPU group 36 after reception of the reproduction request from the external controller 24.

Step S2: The address of the head cluster of a specified clip is checked by searching a FAT (file allocation table).

Step S3: Data of the head cluster is written from the HDD 20 to the DMA buffer 30.

Step S4: The CPU group 36 sets the time-divisional multiplexing controller 40 so that reproduction is started on a specified channel.

Step S5: The CPU group 36 (see FIGS. 2 and 8) sets an "effectiveness flag effectuation enabling instruction," and the process proceeds to step S12.

The following steps S12–S20 are to be executed by the time-divisional multiplexing controller 40 after reception of the reproduction request from the CPU group 36 following step S5.

Step S12: Data of one cell CE is readout from the DMA buffer 30 (see FIGS. 3 and 8) at an address indicated by a read pointer RP.

Step S13: The read pointer RP is incremented.

Step S14: It is checked whether the read pointer RP coincides with a final address FA.

Step S15: If the read pointer RP does not coincide with the final address FA, it is checked at step S15 whether the read pointer RP has reached a cluster boundary. If the read pointer RP has not reached a cluster boundary yet, the process returns to step S12.

Step S16: If the read pointer RP has reached a cluster boundary, it is checked at step S16 whether the cluster boundary is a cluster boundary of buffer B. If it is not a cluster boundary of buffer B, the time-divisional multiplexing controller 40 informs the CPU group 36 that the read pointer RP has reached a cluster boundary and the process returns to step S5.

Step S17: If the cluster boundary is a cluster boundary of buffer B, the read pointer RP is returned to the head of buffer A. The time-divisional multiplexing controller 40 informs the CPU group 36 that the read pointer RP has reached a cluster boundary and the process returns to step S5. Thus, if informed by the time-divisional multiplexing controller 40 (see FIG. 2) that the read pointer RP has reached a cluster boundary, the CPU group 36 again executes step S5 onward.

Step S18: If, at step S14, the read pointer RP coincides with the final address FA, the time-divisional multiplexing controller 40 cancels the effectiveness flag effectuation enabling instruction EFEEI sent from the CPU group 36. When the effectiveness flag effectuation enabling instruction EFEEI is not set as in this case, the time-divisional multiplexing controller 40 does not set the effectiveness flag EF even if data is being readout from the DMA buffer. The process proceeds to step S19.

Step S19: It is checked whether an "increment stop flag" is set. If the increment stop flag is not set, the process returns to step S12.

Step S20: If the increment stop flag is set, the reproduction is finished.

Step S6: After again executing step S5, the CPU group 36 executes step S6 and checks the address of the next cluster of the specified clip by searching the FAT.

Step S7: Data of the next cluster is written from the HDD 20 to the DMA buffer 30.

Step S8: It is checked whether this cluster is the last cluster CT4 of the specified clip (preceding clip) CP1. If not, the process returns to step S12.

Step S9: If it is the last cluster CT4, a final address FA is set and the process moves to step S10.

Step S10: It is checked whether this clip is the last clip of a specified clip group. If not, the process returns to step S12.

Step S11: If it is the last clip, the "increment stop flag" is set and the process returns to step S12.

As described above, the DMA buffer 30 access sequence (invalid data readout scheme) of FIG. 8 proceeds as follows. In reproducing a clip CP1, preceding a certain clip CP2, of an information material 14 coming from the DMA buffer 30 as the information material storing means, in a case where all of the cluster information of the clips that constitute the information material 14 is effective data, the external controller 24 and the CPU group 36 that serve as the effectuation enabling instruction generating means generates, for the effective data, an effectiveness flag effectuation enabling instruction for enabling effectuation of data by setting the effectiveness flag (see FIG. 2). However, in a case where at least part of the last cluster CT4 of the preceding clip that constitutes the information material 14 is invalid data DD, the external controller 24 and the CPU group 36 that serve as the effectuation enabling instruction generating means do not generate, for the invalid data DD, an effectiveness flag effectuation enabling instruction for enabling effectuation of data by setting the effectiveness flag.

The invalid data non-readout scheme of FIG. 7 in which invalid data is not readout appears to be an ordinary concept. However, in the invalid data non-readout scheme of FIG. 7, there is a possibility that at a time point when the read pointer RP has reached the clip end the writing of the next cluster, i.e., the head cluster CT1 of the clip CP2, from the HDD to the DMA buffer has not been completed. It is therefore necessary to check whether the writing has finished and to control the read pointer RP in accordance with a judgment result.

In contrast, in the invalid data readout scheme of FIG. 8, one second is needed to read out data of even the last cluster CT4, and hence the writing of data of the next cluster should necessarily be completed at a time point when the reading has finished. Therefore, only controlling whether to enable effectuation of the effectiveness flag is required, resulting in simplification of the circuit configuration.

When at least part of the last cluster of the preceding clip is invalid data, the effectuation enabling instruction generating means does not generate an effectiveness flag effectuation enabling instruction for enabling effectuation of invalid data by setting the effectiveness flag. Therefore, it becomes known that effective data exists in the last cluster of the preceding clip and hence it is not necessary to set a write finish flag for each cluster, whereby the flag management can be simplified.

The MPEG server utilizing the invention can be used for transmission of, for instance, a commercial message of television broadcast by employing the commercial message as a material (clips). In a current system that uses VTRs, consecutive reproduction is realized by preparing a plurality of VTRs for one channel, editing, in advance, commercial messages to be broadcast on the day concerned so as to be recorded on the same number of tapes as the number of VTRs, and switching among the outputs of the respective VTRs. In the MPEG server utilizing the invention, no such editing operation is necessary with an additional merit that the system can be made relatively compact.

In the information reproduction apparatus and the information reproduction methods according to the embodiments of the invention, in a server for recording and reproducing an information material (clip) that has been coded according to the MPEG standard, a plurality of clips can be reproduced consecutively by use of a transfer ability of less than two channels of recording media by adjusting the transfer rate of the coded information material and controlling the generation of the effectiveness flag.

The following processes are enabled in an MPEG server in which an audio-video material (clip) that has been coded according to the MPEG system standard is recorded on a recording media such as hard disc drives and the clips are readout properly from the recording media upon request, supplied to an MPEG decoder, and decoded (reproduced) there:

1. In a case where all of the last cluster CT4 of the preceding clip CP1 is invalid data or at least a part is invalid data DD, the high-speed access scheme is employed in which data is readout from a hard disk drive at such a high speed as causes no underflow in the MPEG decoder.

2. The invalid data readout scheme of FIG. 8 employs a scheme in which even invalid data DD is readout from the DMA buffer 30 for temporarily storing an information material 14 that is readout from a hard disk drive but a flag for indicating whether the data is effective or invalid is rendered invalid.

3. A special, dedicated MPEG encoder is not needed in which the sizes of a certain clip CP2 and the preceding clip CP1 are made completely equal to a particular value. Further, a process for checking that writing from a hard disk drive to a DMA buffer has finished is not necessary. Therefore, a plurality of clips, for instance, a certain clip CP2 and the preceding clip CP1, can be reproduced consecutively by using a transfer ability of two channels or less (usually less than 2 channels) of recording media per one reproduction channel: 1.33 channels, for example, and 2 channels in the worst case.

Incidentally, although the above embodiments employ hard disk drives as the recording media, the invention is not limited to such a case and can employ other recording media such as an optical disc, a magneto-optical disc, and other types of magnetic disks. Further, the illustrated examples of clips and clusters are just intended for simplification of description and hence the invention is not limited in terms of their formats.

As described above, according to the invention, a plurality of clips of an information material can be reproduced consecutively without the need for preparing resources of two channels and without using a special, dedicated encoder.

Although the present invention has been shown and described with respect to preferred embodiments, various changes and modifications are deemed to lie within the spirit and scope of the invention as claimed.

What is claimed is:

1. An information reproduction apparatus for reading out an information material having a plurality of clips and consecutively reproducing the clips of the information material, comprising:

a recording medium on which an information material having a plurality of clips is recorded;

information material storing means, including temporary buffer means, for reading out, upon request and in sequence, a first clip and a second clip of the information material that each consist of a plurality of clusters from the recording medium, and writing the readout clips to the temporary buffer means;

write finish flag generating means for setting a write finish flag at a time point when writing of a cluster of the second clip from the recording medium to the temporary buffer means by the information material storing means is finished;

information material reproducing means for reproducing the first clip from the temporary buffer means at the same time that the second clip is being written in the temporary buffer means by the information material storing means, and including means for detecting the setting of the write finish flag and pausing reproduction of the first clip until the write finish flag is detected as having been set, so that even in a case where at least part of a last cluster of the first clip is invalid data all of the second clip will be written to the temporary buffer means.

2. The information reproducing apparatus according to claim 1, wherein the information material of the recording medium is audio-video information that has been compression-coded, and the information material reproducing means decodes the information material.

3. An information reproduction apparatus for reading out an information material having a plurality of clips and consecutively reproducing the clips of the information material, comprising:

a recording medium on which an information material having a plurality of clips is recorded;

information material storing means, including temporary buffer means, for reading out, upon request and in sequence, a first clip preceding a second clip of the information material, each clip consisting of a plurality of clusters from the recording medium, and writing the readout clips in the temporary buffer means;

information material reproducing means for reproducing, only in response to detection of an effectiveness flag, the first clip of the information material supplied from the information material storing means at the same time that the information material storing means is storing the second clip; and effectuation enabling flag generating means for generating the effectiveness flag if all information of a last cluster of the first clip that constitutes the information material is effective data and not generating the effectiveness flag if at least part of the last cluster of the first clip that constitutes the information material is invalid data.

4. The information reproducing apparatus according to claim 3, wherein the information material of the recording medium is audio-video information that has been compression-coded, and the information material reproducing means decodes the information material.

5. An information reproduction apparatus for reading out information material having a plurality of clips and consecutively reproducing the clips, comprising:

a recording medium on which the coded information material having a plurality of clips is recorded;

server means, including temporary buffer means, for reading out, upon request and in sequence, a first clip and a second clip of the information material that each consist of a plurality of clusters from the recording medium, and writing the readout clips to the temporary buffer means;

write finish flag generating means for setting a write finish flag at a time point when writing of a cluster of the second clip from the recording medium to the temporary buffer means by the server means is finished;

information material reproducing means for reproducing the first clip from the temporary buffer means at the same time that the second clip is being written in the temporary buffer means by the server means, and including means for detecting the setting of the write finish flag and pausing reproduction of the first clip from the temporary buffer means until a write finish flag is detected as having been set, so that even in a case where at least part of a last cluster of the first clip is invalid data all of the second clip will be written to the temporary buffer means before the information material reproducing means begins reproducing the second clip from the temporary buffer means.

6. The information reproducing apparatus according to claim 5, wherein the information material of the recording medium is audio-video information that has been compression-coded, and the information material reproducing means decodes the information material.

7. An information reproduction apparatus for reading out coded information material having a plurality of clips and consecutively reproducing the clips of the coded information material, comprising:

a recording medium on which the coded information material is recorded;

server means, including temporary buffer means, for reading out, upon request and in sequence, a first clip preceding a second clip of the coded information material, each clip consisting of a plurality of clusters from the recording medium, and writing the readout clips in the temporary buffer means;

information material reproducing means, including effectiveness enabling instruction generating means and decoding means, for reading the first clip of the coded information material from the temporary buffer means at the same time that the server means is writing the second clip to the temporary buffer means, the effectiveness enabling instruction generating means generating and supplying an effectiveness flag effectuation enabling instruction to the decoding means if all information of a last cluster of the first clip that constitutes the coded information material is effective data and not generating the effectiveness flag effectuation enabling instruction if at least part of the last cluster of the first clip that constitutes the coded information material is invalid data; and the decoding means decoding the readout first clip only while supplied with the effectiveness flag effectuation enabling instruction.

8. The information reproducing apparatus according to claim 7, wherein the coded information material of the recording medium is audio-video information that has been compression-coded, and the decoding means decodes the coded information material.

9. An information reproduction method for reading out recorded information material having a plurality of clips that each consist of a plurality of clusters and consecutively reproducing the clips of the information material, comprising the steps of:

reading out from a recording medium, upon request and in sequence, a first clip and a second clip of information material and writing the readout clips to a temporary buffer memory;

setting a write finish flag at a time point when writing of a cluster of the second clip from the recording medium to the temporary buffer memory is finished;

reproducing the first clip from the temporary buffer memory at the same time that the second clip is being written in the temporary buffer memory subject to detection of the setting of the write finish flag and pausing reproduction of the first clip until a write finish flag is detected as having been set, so that even in a case where at least part of a last cluster of the first clip is invalid data all of the second clip will be written to the temporary buffer memory.

10. The information reproducing method according to claim 9, wherein the information material of the recording medium is audio-video information that has been compression-coded, and the reproducing step includes decoding the audio-video information.

11. An information reproduction method for reading out recorded information material having a plurality of clips, each clip consisting of a plurality of clusters, and consecutively reproducing the clips of the information material, comprising the steps of:

reading out from a recording medium, upon request and in sequence, a first clip preceding a second clip of information material, and writing the readout clips in a temporary buffer memory;

reproducing, only in response to detection of an effectiveness flag, the first clip of the information material at the same time that the second clip is being written to the temporary buffer memory; and generating an effectiveness flag if all information of a last cluster of the first clip that constitutes the information material is effective data and not generating the effectiveness flag if at least part of the last cluster of the first clip that constitutes the information material is invalid data.

12. The information reproducing method according to claim 11, wherein the information material of the recording medium is audio-video information that has been compression-coded, and the information material reproducing means decodes the information material.

13. An information reproduction method for reading out recorded information material having a plurality of clips, each clip consisting of a plurality of clusters, and consecutively reproducing the clips of the information material, comprising the steps of:

reading out from a recording medium, upon request and in sequence, a first clip preceding a second clip of information material, and writing the readout clips in a temporary buffer memory;

setting a write finish flag at a time point when writing of a cluster of the second clip from the recording medium to the temporary buffer memory is finished;

reproducing the first clip from the temporary buffer memory at the same time that the second clip is being written in the temporary buffer memory, and including detecting the setting of the write finish flag and pausing reproduction of the first clip from the temporary buffer memory until the write finish flag is detected as having been set, so that even in a case where at least part of a last cluster of the first clip is invalid data all of the second clip will be written to the temporary buffer memory before beginning reproducing the second clip from the temporary buffer memory.

14. The information reproducing method according to claim 13, wherein the information material of the recording medium is audio-video information that has been compression-coded, and the reproducing step includes decoding the information material.

15. An information reproduction method for reading out coded information material having a plurality of clips, each clip consisting of a plurality of clusters, and consecutively reproducing the clips of the coded information material, comprising the steps of:

reading out from the recording medium, upon request and in sequence, a first clip preceding a second clip of the coded information material, and writing the readout clips in a temporary buffer memory;

reading the first clip of the coded information material from the temporary buffer memory at the same time that the second clip is being written to the temporary buffer memory;

generating an effectiveness flag effectuation enabling instruction if all information of a last cluster of the first clip that constitutes the coded information material is effective data and not generating the effectiveness flag effectuation enabling instruction if at least part of the last cluster of the first clip that constitutes the coded information material is invalid data; and decoding the readout first clip only in response to detection of the effectiveness flag effectuation enabling instruction.

16. The information reproducing method according to claim 15, wherein the coded information material of the recording medium is audio-video information that has been compression-coded, and the decoding step decodes the coded information material.

* * * * *